Patented Feb. 24, 1931

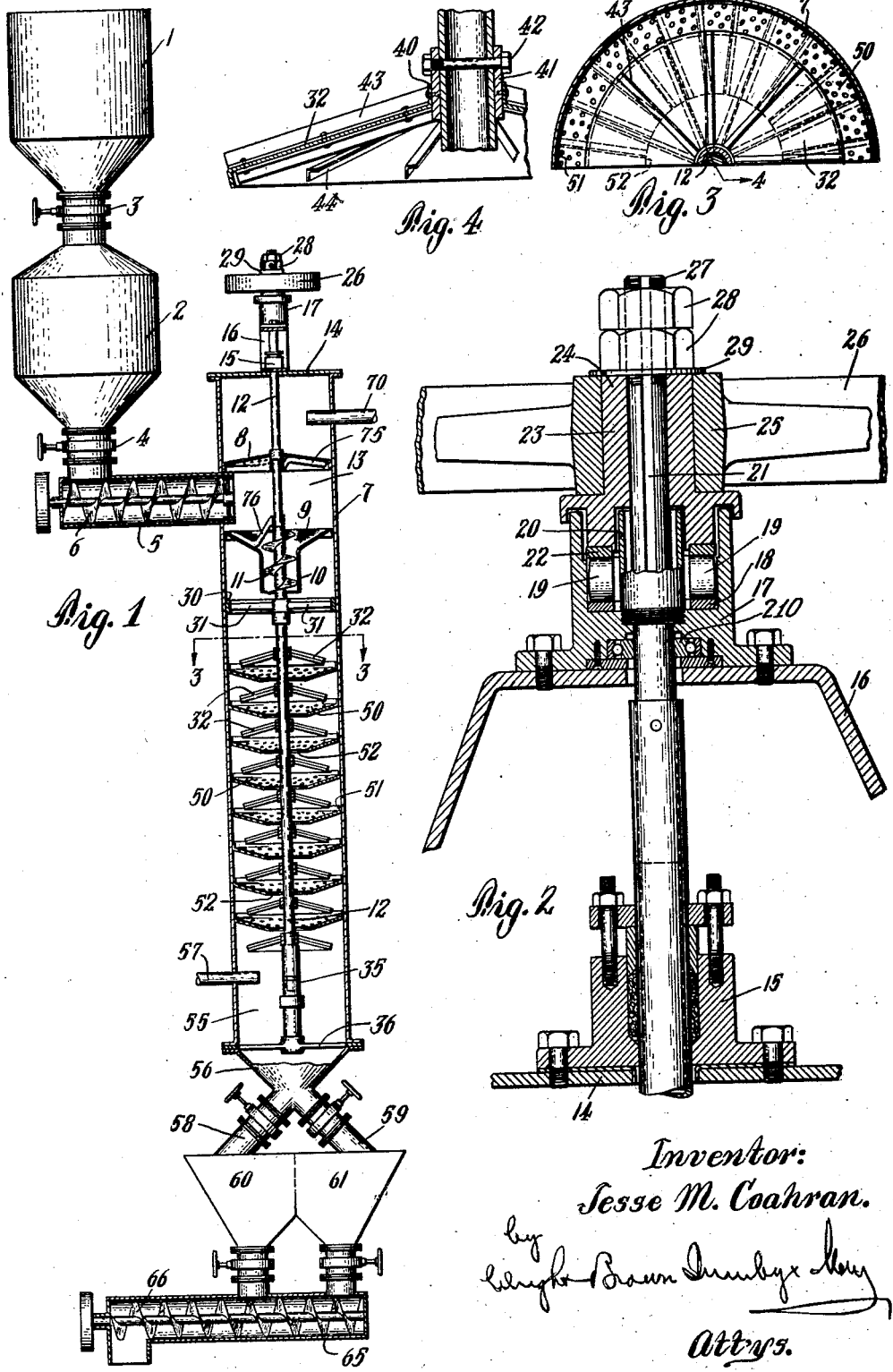

1,793,465

UNITED STATES PATENT OFFICE

JESSE M. COAHRAN, OF SMETHPORT, PENNSYLVANIA

METHOD OF AND APPARATUS FOR LEACHING

Application filed June 9, 1927. Serial No. 197,660.

In my application for patent Serial No. 175,734 filed March 16, 1927, is disclosed and claimed a method of counter-current flow treatment wherein the ratio of volumes of the two interacting materials is so varied during the treating operation as to produce the most complete results on both materials, and as illustrating the invention an apparatus particularly suitable for extracting chemical constituents of one liquid by the use of a liquid solvent for such chemicals is shown and described. In that apparatus the ratio of liquor from which constituents are to be extracted to extracting agent is varied, whereby the more completely extracted liquor is brought into intimate contact with a relatively large volume of substantially fresh extracting agent thus to extract as much as possible of the chemical therefrom, and the extracting agent more highly charged with the chemical is brought into initimate contact with a relatively large volume of substantially fresh or untreated liquor so that the chemical in the solvent at the end of the treating action may be concentrated as possible.

The present invention relates to the application of the same general method to extraction from solid material reduced to a sufficiently granular or pulverulent condition so that it may be progressively related to the solvent sufficiently intimately for the solvent to act thereon, and has to do not only with the method as adapted to such material, but also to an apparatus particularly designed to practice this method in connection with such material.

This invention has application commerically in various industries, as for example, in the extraction of oils from seeds and nuts usually crushed or reduced to meal.

For a more complete understanding of the invention reference may be had to the accompanying drawings in which Figure 1 is a side elevation partly in section of one form of apparatus embodying the invention.

Figure 2 is an enlarged detail central vertical section through the upper portion of the treating column showing more particularly the bearing for a central shaft.

Figure 3 is an enlarged detail section on line 3—3 of Figure 1.

Figure 4 is a fragmentary section on line 4—4 of Figure 3.

Referring to Figure 1, at 1 and 2 are indicated a pair of superposed hoppers for containing the material to be extracted which should be reduced, as by crushing or otherwise, to a sufficiently granular or pulverulent condition so that the solvent may act readily thereon.

Between these hoppers 1 and 2 is a valved connection 3 and the hopper 2 has a similar valved connection with a horizontal pipe 5 containing a feed screw 6. The valve connections 3 and 4 permit the horizontal pipe 5 to be closed off from the atmosphere at all times through permitting the material to be extracted to be fed into the hopper 2 in batches as required. When the material is being fed into the hopper 2 the valve at 4 is closed and the valve at 3 opened. When the hopper 2 is full the valve 3 is closed and the valve at 4 opened so that the material at the hopper 2 may pass into the pipe 5. The feed screw 6 conducts the material past the valve at 4 into the upper portion of a receptacle, herein shown as consisting of a vertical column 7. Above the pipe 5 this column 7 is provided with a screen 8 extending thereacross and of sufficiently fine mesh or having sufficiently small perforations to prevent the material being treated from passing therethrough. Below the pipe 5 and vertically spaced from the screen 8 is a screen 9 shown as of generally conical shape having a central downwardly extending tubular portion 10 within which is arranged a conveyor screw 11 fixed to a vertical shaft 12 positioned coaxially in the column 7. The screens 8 and 9 form between them a chamber 13 which is maintained substantially full of the material to be extracted so as to maintain therein a relatively large volume of substantially untreated material from which the material is fed by means of the screw conveyor 11 at a relatively slow rate.

As shown best in Figure 2 the shaft 12 passes through the upper end wall 14 of the column where there is preferably provided a packing gland 15 to prevent the escape of solvent or vapors from the interior of the column therepast, and above the top 14 of the column is arranged a supporting piece 16 having a thrust bearing 17. This thrust bearing 17 contains a bearing ring 18 on which ride rollers 19. An oil retainer 20 threaded into the member 17 is positioned within the series of rollers 19. A central shaft section 21 is slidably keyed to an upper bearing member 23 which rests on a bearing ring 22 riding on the roller 19, the vertical position of this shaft being adjustable by means of the nuts 28 threaded on its upper end above the washer 29. The lower end of the shaft section 21 is fixed to the upper end of the shaft 12. Fixed to the hub 24 of the member 23 is a belt pulley 26 by which the shaft section 21 and the shaft 12 may be rotated. Beneath the supporting rolls 19, which take the entire weight of the rotating parts, is positioned a ball bearing 210 which takes the lateral pull of the driving belt.

Beneath the screen extension 10 the shaft 12 may find bearing in a spider 30 having arms 31 spaced to permit the solid material fed through the portion 10 by the conveyor screw 11 to fall on to the upper of a series of rotary baffle plates 32 fixed to the shaft 12. The lower of these rotary baffles is positioned considerably above the lower end of the column, and the lower end of the shaft 12 is rotatably mounted in a step bearing 35 carried by a spider 36. By vertical adjustment of the shaft section 21 the vertical position of the rotary baffles may be adjusted as desired, the step bearing 35 in normal service taking no weight, but serving to support the rotating parts when repairs to the upper portion of the mechanism may be necessary. No lubrication for this bearing is required.

As shown best in Figures 3 and 4, each of the rotary baffles 32 is of generally conical shape, being downwardly inclined toward its downwardly flanged outer edge from a flanged central opening at 40, the flange at 40 being fastened to a sleeve 41 fixed to rotate with the shaft 12 as by means of a bolt 42. The upper and lower faces of the baffle may have fixed thereto, radially positioned angles 43 and 44, which not only stiffen the baffle, but act as stirrers, the upper angle 43 tending to carry the material falling thereon around the axis of the shaft 12 before it escapes over the outer edge of the baffle and the angles 44 on the under side acting similarly on the upwardly flowing solvent, as will later appear. Between each pair of adjacent rotary baffles 32 are positioned the stationary baffles 50. These, as shown, are frusto-conical, having marginal flanges 51 which may be made fast to the inner wall of the column and central openings 52 through which the shaft 12 passes and of sufficiently greater diameter than the shaft to permit the solid material to pass therebetween. Preferably the stationary baffles are perforated with holes small enough to prevent the passage of the solid material therethrough but which permit the solvent to pass upwardly therethrough tending to dislodge and float off any solid material which might tend to stick on their upper faces.

As has before been noted, the lower rotary baffle 32 is positioned considerably above the lower end of the column. This provides a substantially open chamber 55 between the lowest rotary baffle and the frusto-conical base 56 of the column, this chamber providing a space which is kept full of substantially fresh solvent which is introduced into the base of the column through the pipe 57. The solvent is introduced through this pipe at such a rate as to cause a relatively slow passage of the solvent upwardly through the column past and through the stationary baffles 50 and around the rotary baffles 32, then up through the screen 9 and through the relatively dense mass of substantially untreated solid material in the chamber 13, through the screen 8 and out through the pipe 70. If desired the shaft 12 may be provided with scraping arms such as 75, 76, sweeping over the surfaces of the screens 8 and 9 to prevent them from becoming clogged by the solid material. The solvent above the chamber 55 is in intimate contact with the solid material passing downwardly which is in such separated or diffused condition that a very intimate contact between the solvent and each particle of the solid material is effected, and as the solvent becomes more highly charged with the extracted material and is about to be withdrawn, it passes up in diffused condition through the relatively large volume of substantially fresh material, the volumetric ratio of solvent to material being maintained relatively small so that its concentration may be rendered as great as possible before it is drawn off. The particles of solid material on the other hand, pass down through the column in diffused condition and in a tortuous passage past the baffles, which carry them more or less in circulation around the central axis of the shaft 12 and when they pass from the lowest baffle they fall in the same diffused or separated condition through a relatively quiescent body of substantially fresh solvent of relatively large volume in the chamber 55, where the volumetric ratio of solvent to material is maintained relatively large. They settle down through this relatively large mass of substantially fresh solvent into the frusto-conical base 56 of the column from which they are drawn off through either of the valved pipes 58 and 59 into the corresponding hoppers 60 and 61. When either of these hoppers is being filled, the connection to the other hopper is closed off by means of its valve, and a valve connection from its lower end is opened into the tube 65 where a worm conveyor 66 acts to remove it for further treatment.

It will be understood that the material thus substantially freed from its content soluble in the solvent may then be treated in any suitable way for the recovery of the solvent which it may still contain and that the solvent containing the constituents dissolved from the material may be treated for the separation of the solvent for re-use and the recovery of the constituents removed thereby. The methods and apparatus for performing those functions form no part of the present invention.

Having thus described an embodiment of this invention it should be evident to those skilled in the art that various changes and modifications might be made therein without departing from its spirit or scope as defined by the appended claims.

I claim:

1. The method of extracting from fluent solid material which comprises maintaining a relatively large volume of such material, feeding such material from said volume at a relatively slow rate and in diffused condition, maintaining a relatively large volume of substantially fresh solvent, effecting flow of solvent from said large volume in intimate countercurrent flow to the solid material fed from said large volume of such material, causing said solvent thereafter in diffused condition to pass through said large volume of such material while maintaining the volumetric ratio of solvent to material relatively small, and removing it together with the substances extracted, causing said material to pass through said relatively large volume of solvent in diffused condition while maintaining the volumetric ratio of solvent to material relatively large, and then removing the extracted material therefrom.

2. An apparatus of the class described comprising a treating receptacle, means for maintaining a relatively large volume of fluent solid material at one end of said receptacle, means for maintaining a relatively large volume of solvent at the opposite end of said receptacle, means for passing fluent solid material in diffused condition from said large volume of solid material through said receptacle and through said large volume of solvent while maintaining the volumetric ratio of solvent to material relatively large, and means for passing solvent from said relatively large volume of solvent in countercurrent flow to and in intimate contact with the solid material in said receptacle, and then in diffused condition through said large volume of solid material.

3. An apparatus of the class described comprising a column, a pair of spaced screens in the upper portion of said column defining a chamber therebetween, means for feeding fluent solid material into said chamber to maintain a relatively large volume of material therein, means for conducting material through said lower screen and passing it in diffused condition downwardly through said column, means for removing said material from the lower end of said column, means for admitting solvent to the lower end of said column above said removing means to maintain a relatively large volume of solvent therein and for passing said solvent from said volume upwardly through said column and in diffused condition through said chamber, and means for removing the solvent from above the upper of said spaced screens.

4. An apparatus of the class described comprising a column, a pair of spaced screens in the upper portion of said column defining a chamber therebetween, means for feeding fluent solid material into said chamber to maintain a relatively large volume of such material therein, a shaft arranged vertically in said column, a screw conveyor carried by said shaft and extending through the lower of said screens and acting as the shaft is rotated to feed material downwardly from said chamber, a series of conical baffles carried by said shaft below said cover, on the upper of which the material drops from said conveyor, said rotary baffles having their outer edges lower than their centers, stationary frusto-conical baffles positioned between said rotary baffles and inclined downwardly toward their centers and having openings at said centers to permit said material to pass downwardly about said shaft, the lower portion of said column being free from baffles to provide a large substantially unobstructed space through which said material may pass in diffused condition from the lowermost baffle, means for removing said material from the lower portion of said space, means for supplying solvent to said space to provide a relatively large volume therein through which said material passes, and to pass upwardly around said baffles and in diffused condition through said chamber, means for withdrawing solvent from above the upper of said screens, and means for rotating said shaft.

5. An apparatus of the class described comprising a column, a pair of spaced screens in the upper portion of said column defining a chamber therebetween, means for feeding fluent solid material into said chamber to maintain a relatively large volume of such material therein, a shaft arranged vertically in said column, a screw conveyor carried by said shaft and extending through the lower of said screens and acting as the shaft is rotated to feed material downwardly from said chamber, a series of conical baffles carried by said shaft below said cover, on the upper of which the material drops from said conveyor, said rotary baffles having their outer edges lower than their centers, stationary frusto-conical baffles positioned between said rotary baffles and inclined downwardly toward their centers and having openings at said centers to permit said material to pass downwardly about said shaft, certain of said baffles having radial ribs thereon and certain being perforated for the passage of solvent therethrough, the lower portion of said column being free from baffles to provide a large substantially unobstructed space through which said material may pass in diffused condition from the lowermost baffle, means for removing said material from the lower portion of said space, means for supplying solvent to said space to provide a relatively large volume therein through which said material passes, and to pass upwardly around said baffles and in diffused condition through said chamber, means for withdrawing solvent from above the upper of said screens, and means for rotating said shaft.

6. An apparatus of the class described comprising a pair of superposed communicating valved hoppers, a column, means for continuously feeding fluent solid material from the lower of said hoppers to the upper portion of said column, means for maintaining a relatively large volume of such material in the upper portion of said hopper and for causing such material to pass downwardly through said column in diffused condition, a plurality of receptacles, means for collecting the material passed through said column into any of said receptacles at will and for shutting off communication of the remainder of said receptacles from said column, means for causing said material to pass in diffused condition through a relatively large volume of solvent before being removed from said column, and for causing solvent from said volume to pass upwardly in intimate contact with the diffused material and in diffused condition through said large volume of such material, and means for then removing said solvent from said column.

In testimony whereof I have affixed my signature.

JESSE M. COAHRAN.